United States Patent Office 3,425,949
Patented Feb. 4, 1969

3,425,949
NOVEL CHEMILUMINESCENT REACTION BETWEEN OXALYL CHLORIDE, A PEROXIDE, AND WATER OR A SUITABLE ALCOHOL IN THE PRESENCE OF A FLUORESCENT COMPOUND
Michael McKay Rauhut, Norwalk, and George Warren Kennerly, Darien, Conn., assignors to American Cyanamid Company, Stamford, Conn., a corporation of Maine
No Drawing. Filed Mar. 25, 1965, Ser. No. 442,818
U.S. Cl. 252—188.3               9 Claims
Int. Cl. C09k 1/00

ABSTRACT OF THE DISCLOSURE

Process of admixing reactants including (1) a reactant selected from the group consisting of a ketodiacid halide and an oxalyl halide, (2) sufficient diluent to form a solution of reactants, (3) a peroxide selected from the group consisting of an organohydroperoxide and an organoperacid, and (4) a fluorescer to produce chemiluminescent light and to compositions comprising the reactants.

---

The present invention relates to novel compositions of matter and reactions for the direct generation of light from chemical energy. By "light" as referred to herein is meant electromagnetic radiation at wavelengths falling between 350 m$\mu$ and 800 m$\mu$.

The art of generating light from chemical energy, i.e., chemiluminescence, is continually in search of compositions which when reacted substantially improve the intensity and lifetime of light emission. Obviously, improved compositions are constantly in demand for use as signal devices, for area illumination, etc.

The art has known for some time that a solution of (1) oxalyl chloride, (2) hydrogen peroxide, and (3) a fluorescent compound generates a light whose life is very short (on the order of about 8 to 30 seconds) and whose intensity is not exceptional, i.e., whose intensity is of little practical utility. Numerous attempts have been made to improve this chemiluminescent composition and many others similar to it, but with little success.

According to a publication by Edward A. Chandross ("Tetrahedron Letters No. 12," pp. 761–765, 1963), the chemiluminescent reaction of oxalyl chloride may be represented as occurring by the following mechanism:

(1)

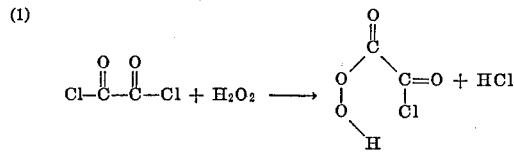

followed by

REACTION 2

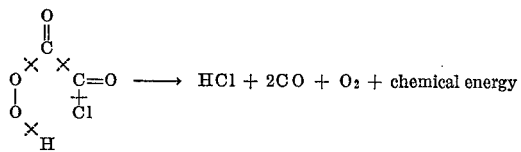

In the above reactions, a cyclic transition structure is formed, followed by a breakdown of the ring into hydrochloric acid, carbon monoxide, oxygen, and chemical energy.

The mechanism of the oxalyl chloride chemiluminescent reaction (as above represented by Chandross) requires solely (1) (a) oxalyl chloride and (b) hydrogen peroxide as necessary reactants to produce a chemical energy release, and (2) any diluent having sufficient solvent properties to form a solution of the above two critical reactants. The above Chandross reaction mechanism as represented by Chandross does not require water as a reactant and therefore would be entirely different and distinct from the mechanism of the invention disclosed herein in which water is a critical reactant, as is discussed at length below. Moreover, an organoperoxide could not follow the Chandross mechanism.

The mechanisms by which chemiluminescent light may be generated are so poorly understood that it is not possible at present to predict those structures which convey the chemiluminescent property. This is amply illustrated by the phthalhydrazide series of compounds, some of which are chemiluminescent and some of which are not chemiluminescent. [See A. Bernanose, "Bull. Soc. Chim. France," 17,567 (1950)].

It is an object of this invention to obtain a chemiluminescent composition and a process employing said composition whereby a high efficiency may be obtained in the conversion of chemical energy into light.

Another object is to obtain a chemiluminescent compound which produces a light over an extended period of time.

Another object of this invention is to obtain a chemiluminescent composition which attains a light of substantially higher intensity than has been obtained with former chemiluminescent compositions.

Another object of this invention is to obtain a chemiluminescent composition which may be employed to obtain light by a process which is mechanically simple and which is economically inexpensive.

Another object of this invention is to obtain a chemiluminescent reactant which is stable over a long period of time and which may be subsequently reacted to obtain chemiluminescent light.

Another object of this invention is to obtain a chemiluminescent reactant which when reacted will obtain chemiluminescent light by a process which is not hazardous.

Another object of this invention is to obtain a chemiluminescent reactant which when employed in the presence of a fluorescent compound will produce chemiluminescent light.

Another object of this invention is to obtain a novel chemiluminescent reactant by reacting water with an organoperoxyoxalyl halide.

Another object of this invention is to obtain a reaction mixture formed by a chemiluminescent reaction of (1) oxalyl halide, (2) a fluorescent compound, (3) water, (4) either (a) an organohydroperoxide or (b) an organoperacid, and (5) sufficient diluent to form a solution of the reactants.

We have unexpectedly discovered that the objects of this invention are obtained by admixing reactants including (1)(a) a reactant selected from the group consisting of a ketodiacid halide and (b) an oxalyl halide, (2) sufficient diluent to form a solution of reactants, (3) a peroxide selected from the group consisting of (a) an organohydroperoxide and (b) an organoperacid, and when the objects include the production of chemiluminescent light, (5) a fluorescer.

The term "chemiluminescent reactant" as used herein means a mixture which when in the presence of a suitable fluorescer will result in a chemiluminescent reaction (1) independently or (2) when reacted with other necessary reactants in the processes as disclosed herein.

The term "chemiluminescent composition" as used herein means a mixture which includes chemiluminescent reactants, which includes the presence of a suitable fluorescer, and which will result in chemiluminescence.

The term "admixing" as used herein means "reacting" or sufficiently bringing together component reactants to obtain a chemiluminescent reaction.

The term "organohydroperoxide," as used herein, represents a peroxide compound which includes (1) at least one "HOO—" group and (2) at least one "R—" group, or a composition which upon reaction produces such a peroxide compound, where a typical organohydroperoxide is ROOH. R is typically defined as an alkyl hydrocarbon group, substituted or unsubstituted.

The term "organoperacid," as used herein, represents a peroxide compound which includes (1) at least one "HOO—" group and (2) at least one

group or a composition which upon reaction produces such a peroxide compound. A typical organoperacid is

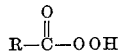

R is defined as an alkyl or an aryl hydrocarbon group, substituted or unsubstituted, for example.

The term "organoperoxyoxalyl halide" compound means a compound of the typical formula, for purposes of this invention:

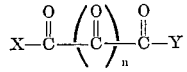

in which X is selected from the group consisting of ROO— and

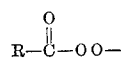

where R is selected from the group consisting of alkyl, aryl, substituted alkyl, and substituted aryl, and in which Y is a halide, wherein $n$ is zero or an integer above zero up to about 7.

The term "ketodiacid halide" compound means a compound of the typical formula:

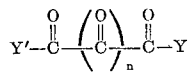

wherein Y and Y' are each respectively a halide and wherein $n$ is an integer above zero up to about 7.

The term "hydrogen peroxide compound" includes (1) hydrogen peroxide and (2) hydrogen peroxide-producing compounds.

By "non-reactive diluent" is meant a diluent which will not react in a manner which will defeat the chemiluminescent reaction.

The term "diluent," as used herein, means a solvent or a vehicle which when employed as or with a solvent does not cause insolubility.

The term "fluorescent compound" means (1) a compound which is a fluorescer and/or (2) a compound which upon reaction produces a fluorescer compound.

In the practice of this invention, the beginning reactants to be employed in the chemiluminescent composition may take several forms. For example, as described above, oxalyl halide and an organohydroperoxide or an organoperacid may be employed as essential components for the process. Alternatively, as another example, the separate (1) oxalyl halide and (2) organohydroperoxide and/or organoperacid may be employed in the combined form of a reaction product thereof, defined above as an organoperoxyoxalyl halide. Accordingly, a process within the scope of this invention may employ reactants which during reaction produce an organoperoxyoxalyl halide, or alternatively may employ any organoperoxyoxalyl halide which has previously been prepared by any conventional process. It clearly would additionally be within the scope of this invention to employ mixtures of (1) organoperoxyoxalyl halide and (2) the separate reactants including oxalyl halide or the ketodiacid halide, and either/or both organohydroperoxide and organoperacid.

When (1) the oxalyl halide and/or ketodiacid halide reactant is (are) separately employed and (2) the organohydroperoxide and/or the organoperacid is (are) separately employed, each of (1) the oxalyl halide and/or ketodiacid halide reactant and (2) the above peroxide reactant are employed normally in a concentration of from about $10^{-3}$ molar to about 4 molar or more, except that the above peroxide reactant concentration should preferably be substantially less than twice the oxalyl halide and/or ketodiacid halide concentration, the ratio of the oxalyl halide and/or ketodiacid halide to the above peroxide preferably being about a 1:1 ratio. The preferred concentration for each of these reactants is from about $10^{-2}$ molar to about 1 molar.

When an organoperoxyoxalyl halide is employed, the concentration normally employed in the process ranges from about $10^{-3}$ to about 4 molar, preferably from about $10^{-2}$ molar to 1 molar.

Concentrations of a mixture of organoperoxyoxalyl halide with separate reactants including (1) oxalyl halide and/or ketodiacid halide and (2) organohydroperoxide and/or organoperacid, vary according to the above defined concentrations, depending upon the relative proportions of components of the mixture.

Although any oxalyl or ketoacid "halide" and/or any organoperoxyoxalyl "halide" may be employed, the preferred halide of this invention is the chloride.

Typical substantially equivalent organohydroperoxides and organoperacids for purposes of this invention include compounds such as tertiary butyl hydroperoxide, tetralin hydroperoxide, cumene hydroperoxide, cyclohexane hydroperoxide, 1-ethylcyclohexane hydroperoxide, 1-methylcyclohex-2-ene hydroperoxide, n-butyl hydroperoxide, peroxy 4-chlorobenzoic acid, 1-phenyl-1-methylpropyl hydroperoxide, dimethyl-p-methoxyphenyl methyl hydroperoxide, 2-butanone 3-hydroperoxide, allyl hydroperoxide, triethylmethyl hydroperoxide, 9-xanthenyl hydroperoxide, 9,10-diphenyl-9,10-dihydroanthracene 9,10-dihydroperoxide, indole-3-hydroperoxide, 1,2,3,4-tetrahydrocarbazolyl-4a-hydroperoxide, 9-amino-10-phenylanthracene hydroperoxide or 2,3-dimethylindole-3-hydroperoxide, and the like.

Typical diluents within the purview of the instant discovery are those (1) that do not readily react to frustrate the production of chemiluminescent light of this invention, and/or (2) which may be a liquid form of any one or more of the essential reactants, such as tertiary butyl hydroperoxide.

Water is a necessary reactant in the production of chemiluminescent light in the present invention. Moreover, water can be present as a supplemental solvent, but because the water tends to react with oxalyl chloride or ketodiacid halide and to thereby quench the chemiluminescent reaction, it cannot be employed as the sole or major solvent. Any non-reactive diluent may be employed so long as the peroxide of this invention is at least partially soluble in the diluent.

The following are illustrative of the additional diluents or solvents which may be employed: non-cyclic or cyclic ethers, such as diethyl ether, diamyl ether, diphenyl ether, anisole, tetrahydrofuran, dioxane, 1,2-dimethoxyethane, and the like; esters, such as ethyl acetate, propyl formate, amyl acetate, cyclohexyl acetate, dimethyl phthalate, diethyl phthalate, methyl benzoate, and the like; aromatic hydrocarbons, such as tertiary butyl benzene, benzene, xylene, toluene, and the like; and aliphatic hydrocarbons such as cyclohexane, hexane, pentane and the like.

The fluorescent compounds contemplated herein are numerous and they may be defined broadly as those which do not readily react on contact with the peroxide of this invention; likewise, they do not readily react with ketodiacid or oxalyl halides. Typical suitable fluorescent compounds for use in the present invention are those which have a spectral emission falling between 330 millimicrons and 700 millimicrons and which are at least partially soluble in any of the above diluents, if such diluent is employed. Among these are the conjugated polycyclic aromatic compounds having at least three fused rings, such as: anthracene, substituted anthracene, benzanthracene, phenanthrene, substituted phenanthrene, naphthacene, substituted naphthacene, pentacene, substituted pentacene, and the like. Typical substituents for all of these are phenyl, lower alkyl, chlorine, bromine, cyano, alkoxy ($C_1$–$C_{16}$), and other like substituents which do not interfere with the light-generating reaction contemplated herein.

Numerous other fluorescent compounds having the properties given hereinabove are well-known in the art, such as, for example, trans-stilbene, 1,3-diphenyl isobenzofuran, pentaphenyl phosphole oxide, 10-methyl-9-acridanone, and the like. Many of these are fully described in "Fluorescence and Phosphorescence," by Peter Pringshein, Interscience Publishers, Inc., New York, N.Y., 1949. While only typical fluorescent compounds are listed hereinabove, the person skilled in the art is fully aware of the fact that this invention is not so restricted and that numerous other fluorescent compounds having similar properties are contemplated for use herein.

It should be noted, however, that although a fluorescent compound is necessary to obtain the production of light, the fluorescent compound is not necessary to obtain a chemical reaction and chemical energy release. Also, a fluorescent or fluorescer-producing (1) organohydroperoxide, (2) organoperacid, or (3) organoperoxyoxalyl halide does not require a separate fluorescer, including typical fluorescer peroxides such as (1) dimethyl - 2-anthracenylmethane hydroperoxide and (2) 2-carboperoxyanthracene, repectively.

The fluorescent compound is normally present in the range from about $10^{-5}$ to 5, preferably $10^{-4}$ to $10^{-1}$ molar and the diluent employed must be present in a sufficient amount to form a solution of the reactants involved in the chemiluminescent reaction.

The chemiluminescent composition of this invention which obtains chemiluminescent light emission upon the admixing of the ingredients of the composition, may be admixed in a single stage of admixing or in a sequence of steps of admixing the separate ingredients. Accordingly, alternative compositions may be prepared which may be stored over an extended period of time and which may be admixed with the final ingredient at a time when the chemiluminescent lighting is desired. For example, the composition may be a composition which includes (1): (a) organohydroperoxide and/or organoperacid or (b) organoperoxyoxalyl halide of this invention, (2) a fluorescer compound, any one or more additional necessary reactants such as an oxalyl halide, and a diluent. However, if the peroxide (of this invention) is present, the addition of water will cause the chemiluminescent process to proceed substantially instantly. Another example would be a composition which includes a water, a fluorescer, and the peroxide compound of this invention. An alternative composition would be a composition which includes an oxalyl halide or a ketodiacid halide, a fluorescent compound, non-aqueous diluent, but which does not include a peroxide compound. Another alternative composition would be a composition which includes the fluorescent compound, peroxide and a diluent, but which does not include the oxalyl halide or the ketodiacid halide. The preferred compositions which would be less than all necessary components to produce a chemiluminescent light, and would be a composition which would be substantially stable to a practical degree over an extended period of time; otherwise there would be no real advantage in forming a chemiluminescent reactant to be employed in a subsequent chemiluminescent reaction. Accordingly if a composition is prepared which includes the water reactant, it is necessary to relatively promptly thereafter admix the peroxide compound of this invention before the water reacts with an oxalyl halide or a ketodiacid halide.

The chemiluminescent reaction process of this invention may be carried out at any temperature below boiling. Temperature is not critical.

The order of addition of the reactants in the chemiluminescent reaction is not critical, except as noted above regarding water addition. Additionally, where a molar ratio of peroxide to oxalyl halide on the order of 2:1 or higher is used, it is desirable to add the required water concurrently with the peroxide.

The wavelength of the light emitted by chemiluminescence of the compositions of this invention, i.e., the color of the light emitted, may be varied by the addition of any one or more energy transfer agents (fluorescers) such as the known fluorescent compounds discussed at length above.

The wavelength of the light emitted by the composition of this invention will vary, depending upon the particular fluorescent component employed in the reaction mixture.

In the practice of the process of this invention, to obtain chemiluminescent light, (1) a peroxide compound selected from the group consisting of organohydroperoxide and organoperacid reacts with an oxalyl halide or a ketodiacid halide (A) in relative ratios sufficient to produce an organoperoxyoxalyl halide (B) of the typical formula represented in the definition above, the reaction taking place in the presence of sufficient diluent to form a solution, and (2) the organoperoxyoxalyl halide formed thereby is thereafter or substantially simultaneously reacted with water in a reaction wherein the hydroxyl group of water replaces one of the halide substituents of the oxalyl compound, with a simultaneous release of chemical energy which in the presence of a fluorescer produces chemiluminescent light. As discussed above, alternatively the organoperoxyoxalyl halide may be the beginning reactant. The mechanism is typically represented below.

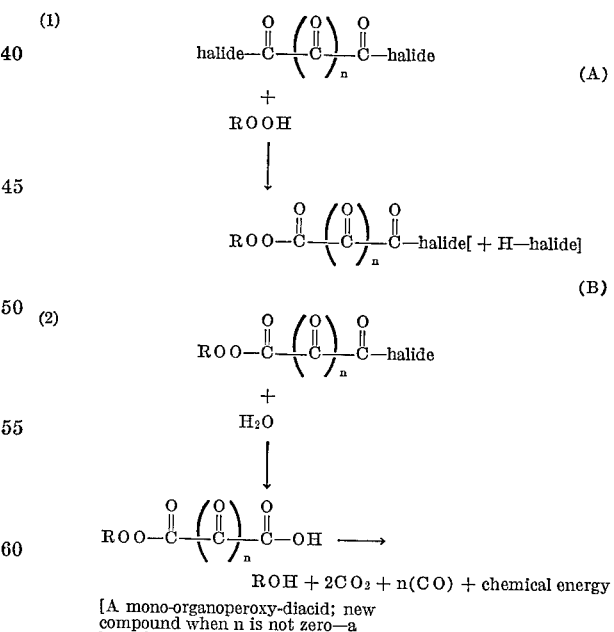

where $n$ is zero or an integer up to about 7.

In the presence of a fluorescer, or if the R is a fluorescer-substituent, chemiluminescent light is produced.

The compound formed during the chemiluminescent reaction represented above is a new compound.

It is clear that no apparent relationships exist in the mechanism of this invention, as represented above, and the mechanism of oxalyl chloride reaction as represented by Chandross, discussed above at length.

Pursuant to the present invention disclosed herein, very intense light is generated and the light emissions last any-where from about 16 to about 60 times longer than that of the art-known aqueous compositions described hereinbefore, such as oxalyl chloride.

The following examples are intended to illustrate the present invention are in no way intended to limit the invention except as limited in the appended claims.

Example 1

The addition in the dark of 5 ml. (5 millimoles) of a one molar solution of oxalyl chloride in anhydrous diethyl ether to 5 ml. (5 millimoles) of one molar anhydrous hydrogen peroxide [1] in diethyl ether containing two mg. of 9,10-diphenyl anthracene produced a bright blue chemiluminescence of short duration.

This Example 1 demonstrates that Chandross' invention appeared to work in a substantially anhydrous solvent system. Thus, the results of Example 1 conforms to the mechanism described by Chandross, discussed above, in which water is not a reactant.

Example 2

A freshly prepared solution of 10 ml. of 1 M oxalyl chloride in anhydrous diethyl ether and 5 mg. of 9,10-diphenyl anthracene was reacted with 10 ml. of 0.75 M anhydrous tertiary butyl hydroperoxide in anhydrous diethyl ether. No chemiluminescence was observed.

This Example 2 demonstrates that the substitution of ROOH and HOOH in the process of Chandross in a completely anhydrous solvent does *not* provide chemiluminescent light.

Example 3

Di-tertiarybutylperoxyoxylate (0.2 g.; 0.85 millimole) typically prepared by the method of Bartlett, J. Am. Chem. Soc. 82, P. D. Bartlett, E. P. Benying, R. E. Pincock, 1962 (1960) was dissolved in 50 ml. of anhydrous ethyl acetate containing 5 mg. of 9,10-diphenyl anthracene. The addition of one ml. of water to this solution in the dark failed to produce light.

This Example 3 demonstrates that compounds of the di-substituted formula

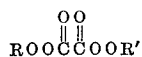

fail to obtain chemiluminescent properties. The example thus narrows the scope of the invention to the use of compounds which have the structure

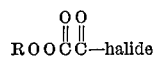

i.e., a mono-organoperoxyoxalyl halide.

Example 4

A solution of 4.5 g. (0.05 mole) of anhydrous tertiary butyl hydroperoxide in 40 ml. of anhydrous hexane was added to a cold (0° C.) solution of 12.6 g. (0.1 mole) of oxalyl chloride in 40 ml. of anhyldrous hexane during one hour. The solution was then stirred for 2.5 hours at 0°. The solvent was removed at reduced pressure using a Dry Ice cooled condenser flask and an ice bath around the product flask. An addition funnel in the apparatus was used to add 40 ml. of anhydrous hexane to the product flask and this fresh solvent was removed under reduced pressure. This process was repeated several times until a sample of the distillate gave no light when reacted with hydrogen peroxide solution containing 9,10-diphenyl anthracene, indicating that all excess oxalyl chloride had been removed from the product. A known weight of anhydrous hexane was then added to the distillation flask and the resulting solution weighed to obtain 6.1 g. (68%) of tertiarybutylperoxyoxalyl chloride.

---
[1] Completely anhydrous hydrogen peroxide is difficult to obtain; this experiment contained approximately $10^{-2}$ M $H_2O$.

This Example 4 demonstrates a method of preparing compounds of the type

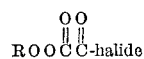

See also the reference: J. Am. Chem. Soc. 82, P. D. Bartlett, E. P. Benying, R. E. Pincock, 1962 (1960).

The addition of 5 drops of water to 10 ml. of 0.9 M tertiarybutylperoxyoxalyl chloride in hexane with 3 mg. of 9,10-diphenyl anthracene present produced a bright blue chemiluminescence.

Example 5

A solution of tertiarybutylperoxyoxalyl chloride was prepared by adding 9.0 g. (0.1 mole) of tertiary butyl hydroperoxide to 200 ml. of 1 M oxalyl choride (0.2 mole) in ether during a 30 minute period. After standing an additional 30 minutes a 25 ml. aliquot of the solution was reacted 5 drops of water in the presence of 10 mg. of 9,10-diphenyl anthracene to give a strong blue chemiluminescence.

The above Example 5 illustrates the invention in the embodiment in which the reactants are employed in substantially their simplest form, employing the oxalyl halide and an organo hydroperoxide as beginning reactants.

Example 6

A solution of 0.22 g. (0.001 mole) of peroxy lauric acid in 5 ml. of diethyl ether was added to 5 ml. of 0.2 M (0.001 mole) oxalyl chloride in diethyl ether containing 2–3 mg. of 9,10-diphenyl anthracene.

On the addition of 5 drops of water to the resulting solution a medium intensity blue chemiluminescence was observed.

This above Example 6 illustrates the invention in the embodiment in which the reactants are employed in substantially their simplest form, employing the oxalyl halide and an organoperacid as beginning reactants.

Example 7

The addition of 1.27 g. (0.01 mole) of oxalyl chloride to a solution of 0.9 g. (0.01 mole) of tertiary butyl hydroperoxide, 2.5 ml. of water, and 5 mg. of 9,10-diphenyl anthracene in 50 ml. of glyme produced a bright blue chemiluminescence.

This above Example 7 illustrates a typical method of admixing reactants, demonstrating that the order of admixing is not important, except as discussed above relative to water addition.

Example 8

The addition of 5 drops of water to a solution of 1.5 g. (0.01 mole) of ditertiary butyl peroxide, 1.27 g. (0.01 mole) of oxalyl chloride, and 2–3 mg. of rubrene in 20 ml. of benzene produced no light even on shaking.

The above Example 8 demonstrates that compounds of the typical formula ROOR is not an operative peroxide compound for purpose of this invention. The organoperoxide for this invention is thereby limited to the employment of organohydroperoxides and/or organoperacids of the typical formulae defined above.

Example 9

In an experiment similar to Example 8 in which benzoyl peroxide replaced ditertiary butylperoxide no light was produced.

This above Example 9 is somewhat similar to the preceding Example 8, and demonstrates that organoperanhydrides (diacylperoxide) are not operative in this invention as substitutes for either an organohydroperoxide or an organoperacid of the typical formulae defined above.

Example 10

The replacement of water by 5 drops of anhydrous methanol in an experiment similar to Example 1 failed to produce chemiluminescence.

The above Example 10 illustrates that ROH (an alcohol) cannot be employed as a substitute for the critical water (HOH) reactant of this invention.

Example 11

A solution of 0.9 g. (0.01 mole) of tertiary butyl hydroperoxide in 10 ml. of anhydrous dioxane was added to a solution of 3.1 g. (0.02 mole) of ketomalonyl chloride in 50 ml. of anhydrous dioxane containing 5 mg. of rubrene. No light emission was observed. After the solution had aged for 30 minutes, 10 drops of water were added to it. A bright yellow chemiluminescence was observed.

This example demonstrates the process of this invention with a keto acid chloride.

It is within the scope of this invention to make such modifications of the compositions and processes disclosed herein as would be obvious to a person of ordinary skill in this art, and it is to be understood that the examples illustrating this invention are intended to limit the invention only insofar as is stated in the specification and as the following claims are limited. Also, it is within the scope of this invention to form an apparatus such as a container or (1) insoluble or (2) dissolvable capsule in which the reactant of this invention is enclosed for subsequent reaction with the other ingredients necessary to produce chemiluminescent energy and light.

We claim:

1. A process for producing chemiluminescent light comprising: admixing reactants comprising (1) water, and (2) a substantially anhydrous organoperoxyoxalyl halide compound, having the formula:

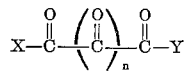

wherein X is selected from the group consisting of ROO— and

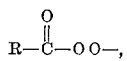

R is selected from the group consisting of alkyl and aryl groups, Y is a halide, and N is an integer from 0 to 7, and a non-aqueous diluent, in the presence of a fluorescer.

2. A process for producing chemiluminescent light comprising: admixing reactants comprising (1) water, and (2) a substantially anhydrous organoperoxyoxalyl halide compound, having the formula

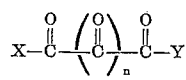

wherein X is selected from the group consisting of ROO— and

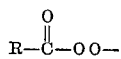

R is selected from the group consisting of alkyl and aryl groups, Y is a halide, and $n$ is an integer from 0 to 7, and a non-aqueous diluent, said anhydrous organoperoxyoxalyl halide compound being fluorescent compound.

3. A chemiluminescent composition comprising (1) a substantially anhydrous organoperoxyoxayl halide compound of the formula:

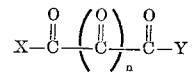

wherein X is selected from the group consisting of ROO— and

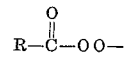

R is selected from the group consisting of alkyl and aryl groups, Y is a halide, and $n$ is an integer from 0 to 7, (2) a non-aqueous diluent, (3) water, and (4) a fluorescer.

4. A process for producing chemiluminescent light comprising: admixing reactants comprising (1) water, (2) substantially anhydrous tertiary butyl hydroperoxide, (3) a fluorescent compound, and (4) oxalyl chloride, said reactants including a diluent.

5. A process for producing chemiluminescent light comprising: admixing reactants comprising (1) water, (2) a substantially anhydrous tertiarybutylperoxyoxalyl chloride, and (3) a fluorescent compound, said reactants including a diluent.

6. A process for producing chemiluminescent light comprising: admixing reactants comprising (1) water, (2) substantially anhydrous peroxylauric acid, (3) a fluorescent compound, and (4) oxalyl chloride, said reactants including a diluent.

7. The process of claim 1 wherein said organoperoxyoxalyl halide is formed by the reaction of a compound of the formula

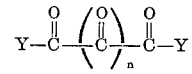

wherein Y is a halide and $n$ is an integer from 0 to 7, with a substantially anhydrous composition selected from the group consisting of an organohydroperoxide and an organoperacid.

8. The process of claim 7 wherein said anhydrous compound is a fluorescent compound.

9. The process of claim 7 wherein the reactants include a fluorescer.

References Cited

UNITED STATES PATENTS 2,420,286    5/1947    Lacey et al. _____ 252—188.3

LEON D. ROSDOL, Primary Examiner.

J. D. WELSH, Assistant Examiner.

U.S. Cl. X.R.

252—301.2